United States Patent [19]

Sun

[11] Patent Number: 4,935,837
[45] Date of Patent: Jun. 19, 1990

[54] PHASE COMPARISON RELAYING SYSTEM WITH SINGLE CHANNEL COMMUNICATIONS LINK

[75] Inventor: Shan C. Sun, Coral Springs, Fla.

[73] Assignee: ABB Power T&D Company Inc., Blue Bell, Pa.

[21] Appl. No.: 332,186

[22] Filed: Apr. 3, 1989

[51] Int. Cl.$^5$ .............................................. H02H 3/08
[52] U.S. Cl. ........................................ 361/64; 361/66
[58] Field of Search ...................... 361/64, 66, 68, 81

[56] References Cited

U.S. PATENT DOCUMENTS

| | | |
|---|---|---|
| 2,977,583 | 9/1965 | Timothy et al. . |
| 3,521,274 | 4/1967 | Sawai . |
| 3,560,856 | 12/1967 | Kaneko . |
| 3,986,079 | 10/1976 | Hinman, Jr. et al. . |
| 4,053,940 | 10/1977 | Hinman, Jr. et al. . |
| 4,275,429 | 6/1981 | Church et al. ........................ 361/64 |
| 4,380,746 | 4/1983 | Sun et al. . |
| 4,464,697 | 8/1984 | Sun ........................................ 361/64 |
| 4,510,453 | 4/1985 | Sun et al. . |
| 4,538,195 | 8/1985 | Elmore .................................. 361/64 |
| 4,538,196 | 8/1985 | Sun et al. ............................. 361/64 |
| 4,591,940 | 5/1986 | Sun et al. ............................. 361/68 |
| 4,674,002 | 6/1987 | Li et al. ................................. 361/66 |
| 4,725,914 | 2/1988 | Garitty ................................. 361/64 |

OTHER PUBLICATIONS

Westinghouse, Technical Data 76-2, Effective 09/78 pp. 1-4, Westinghouse Electric Corporation, Relay-Instrument Division, Coral Springs, Fla.
Westinghouse I.L. 40-201.42, Instructions, Segregated Phase Comparison System Three Subsystems (A/B/C) Using DIT-4A Audio Tones, Effective Apr. 1979, Westinghouse Electric Corporation, Relay-Instrument Division, Coral Springs, Fla. pp. 1-30.

*Primary Examiner*—Todd E. DeBoer

[57] ABSTRACT

The square wave phase comparison signals generated for each phase of a power distribution system by phase comparison relays at each end of a protected three phase transmission line segment are combined to generate a single, multi-level signal with discrete values for each instantaneous combination of square wave signals. The single, multi-level signal is used to modulate a carrier signal which is transmitted over a single channel of a two-way communications link to the other terminal where the carrier signal is demodulated to reproduce the multi-level signal. The reproduced multi-level signal is then decoded to generate remote square wave signals which are compared with the phase of locally generated square wave signals to generate trip signals for circuit breakers at the respective terminals. Square waves representative of priority functions, such as direct transfer trips, can be integrated into the single, multi-level signal transmitted to the other terminal.

10 Claims, 9 Drawing Sheets

| TRUTH TABLE | | | |
|---|---|---|---|
| $I_{SWP}$ | $I_{SWN}$ | $RI_{SW}$ | TRIP |
| 1 | 0 | 1 | 1 |
| 0 | 1 | 0 | 1 |
| 0 | 1 | 1 | 0 |
| 1 | 0 | 0 | 0 |
| 0 | 0 | 0 | 0 |
| 0 | 0 | 1 | 0 |

FIG. 4

| TRUTH TABLE | | | | |
|---|---|---|---|---|
| LEVEL | $I_{CSW}$ | $I_{BSW}$ | $I_{ASW}$ | FUNCTION/ EVENT |
| 0 | 0 | 0 | 0 | NO EVENT (GUARD) |
| 1 | 0 | 0 | 1 | $I_{ASW}$ |
| 2 | 0 | 1 | 0 | $I_{BSW}$ |
| 3 | 0 | 1 | 1 | $I_{ASW} \cdot I_{BSW}$ |
| 4 | 1 | 0 | 0 | $I_{CSW}$ |
| 5 | 1 | 0 | 1 | $I_{ASW} \cdot I_{CSW}$ |
| 6 | 1 | 1 | 0 | $I_{BSW} \cdot I_{CSW}$ |
| 7 | 1 | 1 | 1 | $I_{ASW} \cdot I_{BSW} \cdot I_{CSW}$ |
| 8 | X | X | X | PRIORITY FUNCTION 1 |
| 9 | X | X | X | PRIORITY FUNCTION 2 |
| 10 | X | X | X | DIRECT TRANSFER TRIP (DTT) |

FIG. 8

PHASE COMPARISON RELAYING SYSTEM WITH SINGLE CHANNEL COMMUNICATIONS LINK

BACKGROUND OF THE INVENTION

1. Field of the Invention

This invention relates to protective relaying systems for multiphase electric power distribution networks, and particularly to such systems in which protective relays at terminals at opposite ends of a protected line segment exchange instantaneous current phase information over a communications link for use in identifying faults in the protected segment and for generating trip signals for circuit breakers at each terminal which isolate the faulted line segment.

2. Background Information

Electric power transmission lines are protected against faults by protective relay systems which operate circuit breakers to isolate the faulted segment of the line. Such systems include a protective relay at each terminal of the protected line segment which analyze line currents and in some systems voltages to determine the location of a fault and to trip the circuit breakers at the terminals to isolate a fault determined to be between the terminals.

In one type of protective relaying known as phase comparison relaying, relays at the two ends of a protected line segment generate for each phase a square wave signal representative of an instantaneous comparison of the magnitude of the current with a keying level indicative of a fault condition. These square wave signals for each phase are transmitted over a communications link to the other terminal where they are compared to local square wave signals generated by instantaneous comparisons of the local phase currents with other threshold signals. Coincidence of the local and remotely generated square wave signals indicate an internal fault and generate trip signals which operate circuit breakers to isolate the protected line segment. Examples of such phase comparison relaying systems are disclosed in U.S. Pat. Nos. 3,986,079 and 4,053,940.

Typically, the remote square wave signals are transmitted between the terminals at opposite ends of the protected line segment over a two-way communications link by modulating a carrier signal. While other modulating techniques could be employed, U.S. Pat. No. 4,380,746 discloses a pulse period modulation technique which is used with the pulse period demodulation technique disclosed in U.S. Pat. No. 4,510,453 to provide a simple modulation-demodulation scheme which meets the real time requirements of phase comparison relaying.

Conventionally, three separate two-way channels, one for each phase, are used to exchange the square wave information between terminals. Typically, a telephone modem in which the modulated carrier is transmitted as tones is used in the communication link.

Phase comparison relaying schemes may also generate a direct transfer trip signal which is a direct command to trip the remote circuit breaker independent of the phase relation of the currents of the two terminals. These signals may be generated for instance for maintenance purposes, or to coordinate tripping of the circuit breaker with circuit breakers in other protected line segments of the distributing network.

U.S. Pat. No. 4,464,697 discloses a technique for transmitting this direct transfer trip signal over the available communications channels by disconnecting the square wave signals from the modulator and substituting a separate tone generator unique to the direct trip signal.

While the current systems provide satisfactory protective relaying, there is a need for a phase comparison relaying system which requires fewer communications channels.

SUMMARY OF THE INVENTION

These and other needs are satisfied by the invention which is directed to protective relay apparatus which includes a protective relay at each terminal of a protected line segment in a multiphase ac transmission line and a single channel two-way communications link between the protective relays. Each protective relay includes means monitoring selected parameters in this transmission line segment at the associated terminal for each phase and means generating from the parameter signals square wave signals for each phase representative of predetermined conditions at that terminal. A single, modulated carrier signal having discrete levels of modulation for each instantaneous combination of selected of the square wave signals for each phase is generated for transmission over the single channel of the two-way communications link to the other terminal. Each protective relay also includes means for generating remote square wave signals corresponding to the selected square wave signals at the transmitting terminal from the single modulated carrier signal received over the single channel of the communications link. Each protective relay compares for each phase the remote square wave signals received from the other terminal with designated square wave signals generated by that protective relay and generates trip signals for circuit breakers at the terminal in response to predetermined comparisons.

In a preferred embodiment of the invention, a single modulated carrier signal is generated by means which generates a combined signal having discrete amplitude levels representative of the instantaneous combination of the selected square wave signals, and means for modulating a single carrier signal to generate the carrier signal having the discrete levels of modulation for each instantaneous discrete amplitude level of the combined signal.

As applied to a phase comparison relaying system, the square wave signals transmitted to the other terminal comprise signals generated by comparing the phase current with a keying signal selected to represent fault conditions at the associated terminal. These signals which become the remote square wave signals at the other terminal are compared with local square wave signals generated from comparisons of the local current signals with security margin signals, with trip signals being generated for designated phase comparisons between the remote and local square wave signals.

As another feature of the invention, square waves representing priority functions such as a direct transfer trip, can be integrated into the single modulated carrier signal as another discrete level.

In a preferred embodiment of the invention, the single multiple level combined signal is generated by generating signals for each separate square wave of different unit value and adding these signals to generate the combined signal. The unit values of each square wave signal are selected such that a unique sum is produced for each unique combination of the square waves. In the preferred embodiment, the decoder means includes means for generating reference signals corresponding to each of the unique sums. These reference signals are each compared with the remote combined signal to generate one of a plurality of intermediate signals for the combination of square wave signals represented by the level of the remote combined signal. Each of the intermediate signals which represents the combination including a particular square wave signal is applied to a logic gate which generates the remote square wave signal.

BRIEF DESCRIPTION OF THE DRAWINGS

A full understanding of the invention can be gained from the following description of the preferred embodiment when read in conjunction with the accompanying drawings in which:

FIG. 4 is a truth table illustrating conditions under which the protective relay of FIG. 1 operating in accordance with the scheme disclosed in FIGS. 2 and 3 generates a trip signal.

FIG. 8 is a truth table illustrating the conditions for generating discrete levels of the combined signal.

DESCRIPTION OF THE PREFERRED EMBODIMENT

Figure 1:
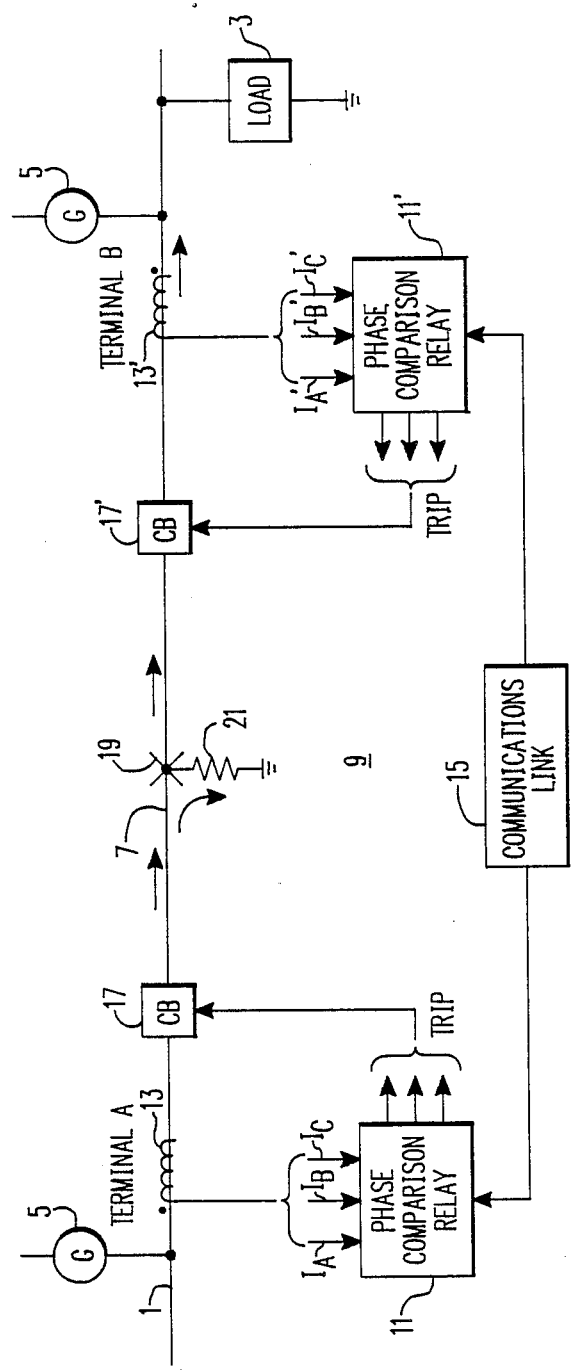
FIG. 1 is a schematic diagram of an electric power distribution system protected by a phase comparison relaying system incorporating the present invention.

As shown in FIG. 1, the invention is applied to a three phase electric power distribution system 1 which delivers to loads, such as the load 3, three phase alternating current power generated by one or more generators 5. At least one segment 7 of the electrical power distribution system between the terminals A and B is protected by a phase comparison relaying system 9 in accordance with the invention.

The phase comparison relaying system 9 includes phase comparison relays 11 which monitor the phase currents in the protective line segment 7 through current transformers 13 and 13'. The phase comparison relays 11 and 11' compare information over a two-way communications link 15. In response to the identification of internal faults on the protected line segment 7, the phase comparison relays 11 and 11' generate trip signals for one or all of the phases of circuit breakers 17 and 17' which operate to isolate the line segment 7.

Figure 2:
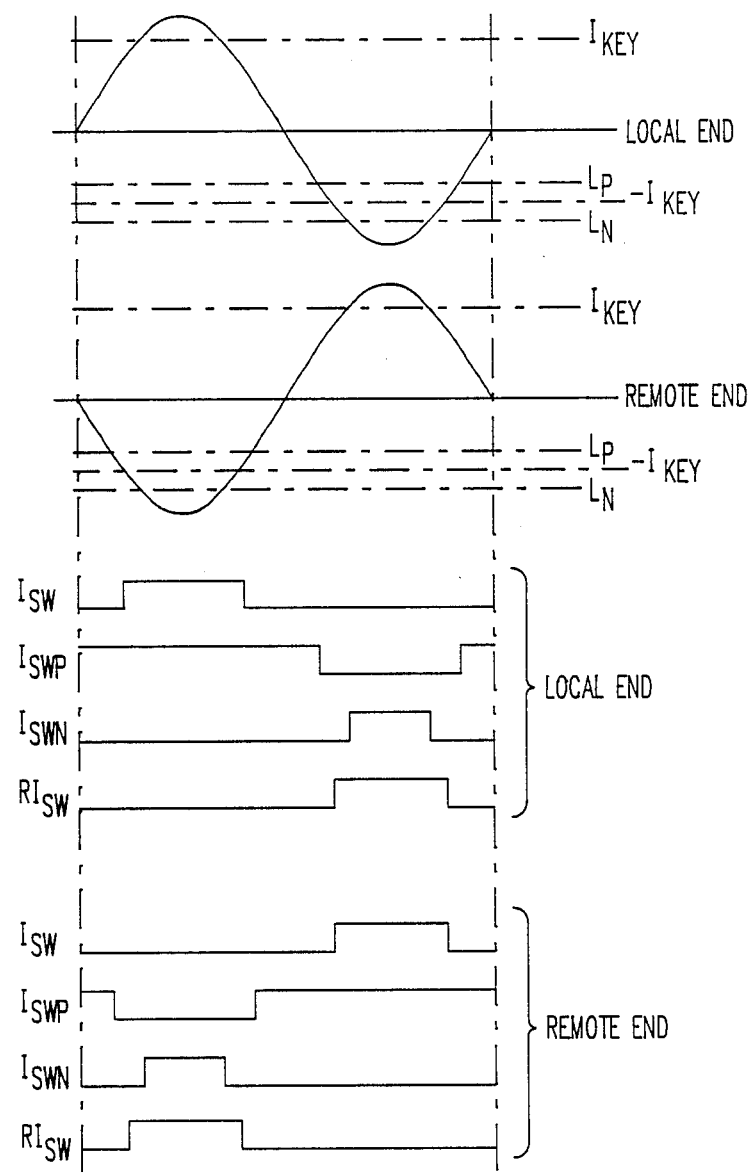
FIG. 2 is a waveform diagram illustrating signals generated by the protective relay system of FIG. 1 in response to an external fault.
Figure 3:
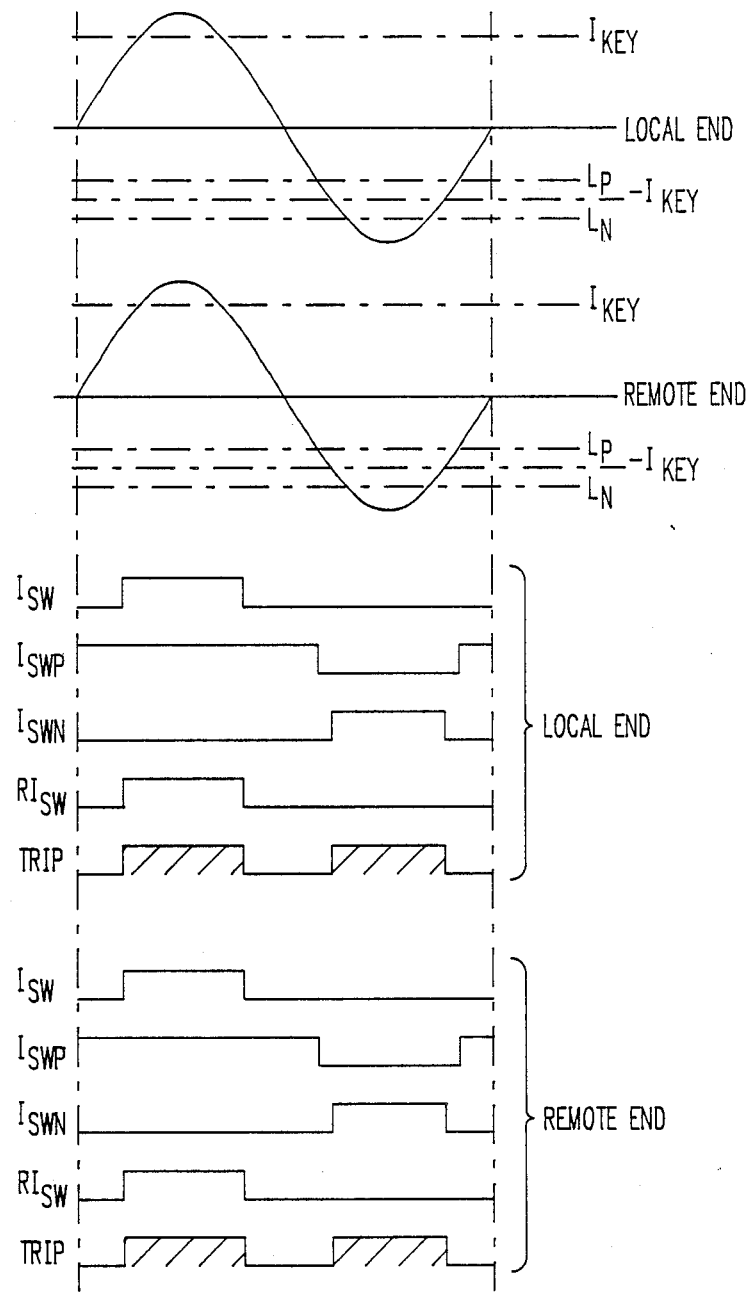
FIG. 3 is a waveform diagram illustrating operation of the protective relay of FIG. 1 in response to an internal fault.

The principle of operation of the phase comparison relay system 9 can be understood from the examples shown in FIG. 2 through 4. Under normal conditions, that is no internal faults in the protected line segment 7, current will flow into terminal A and out of terminal B in supplying power to the load 3. If there is an internal fault such as at 19 in FIG. 1, current will continue to flow into the line segment 7 at terminal A but will reverse at terminal B and flow into the fault if the fault offers a low resistance path 21 to ground. If, however, the resistance to ground 21 of the fault 19 is high, current may continue to flow out of terminal B, but at a much lower level than the current flowing into terminal A.

The phase comparison relay schemes disclosed in U.S. Pat. Nos. 3,986,079 and 4,053,940 are able to detect internal faults in the line segments 7 under both of these conditions. As shown in FIGS. 2 and 3, each phase current at each terminal is compared with a reference level, $I_{KEY}$, which is set at a level indicative of a fault. Each local phase current is also compared with two other reference or security margin signals of opposite polarity, one of which $L_P$, is smaller in magnitude than $I_{KEY}$, and the other of which is $L_n$ is greater in magnitude. A square wave signal $I_{SW}$ generated at each terminal is normally low but goes high when the phase current exceeds $I_{KEY}$. Additional square wave signals $I_{SWP}$ generated at each terminal are high as long as the local phase current is more positive than $L_P$. In addition, square wave signal $I_{SWN}$ are generated for each phase which go high only when the local phase current is more negative than $L_N$.

Each terminal transmits over the communications link 15 its local $I_{SW}$ square wave to the other terminal where it is identified as the remote square wave $RI_{SW}$.

It will be noted from FIG. 1 the signals generated by the current transformers 13 at terminal A and 13' at terminal B have opposite polarity. Thus, in the case of an external fault where the current continues to flow into terminal A and out of terminal B for instance, the corresponding phase currents at terminal A and B will be 180 degrees out of phase as shown in FIG. 2. Each terminal then looks for coincidence between the local $I_{SWP}$ and $I_{SWN}$ signals, and the remote square wave signal $RI_{SW}$ for each phase. In the case of $I_{SWP}$ both the local signal $I_{SWP}$ and the remote square wave signal $RI_{SW}$ must be high simultaneously. On the other hand, the local signal $I_{SWN}$ must be high when $RI_{SW}$ is low in order to identify the presence of an internal fault. As can be seen in FIG. 2, both phase currents are of sufficient magnitude to generate the keying signals and the local security margin signals, however, because the currents at the opposite ends of the protected line segment are detected as being out of phase, this is an indication that the current is flowing into one terminal and out of the other terminal and, hence, the detected fault is external to the protected line segment.

FIG. 3 illustrates conditions for a large internal fault with load current flowing into both terminals. In this instance, it can be seen that a trip signal is generated on the positive half cycle since both the local signal $I_{SWP}$ and the remote square wave signal $RI_{SW}$ are high. A trip signal is also generated on the negative half cycles when $I_{SWN}$ is high while the remote signal $RI_{SW}$ is low. In the example given, these conditions will exist at both terminals and therefore both circuit breakers 17 and 17' will be tripped. FIG. 4 illustrates a truth table for the coincidence of the local square wave signals, $I_{SWP}$ and $I_{SWN}$ with the remote square wave signal $RI_{SW}$ required to generate a trip signal.

Figure 5:
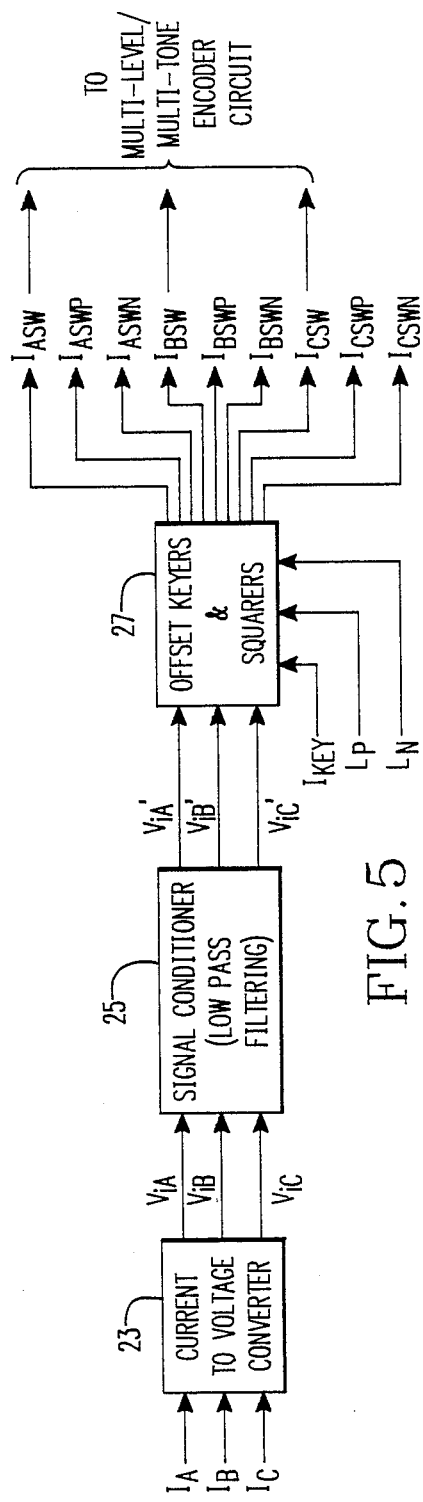
FIG. 5 is a block diagram of a portion of the protective relay in accordance with the invention which generates the phase comparison signals.

In accordance with the present invention, the $I_{SW}$ square wave offset keyed signals for each phase are transmitted over the communications link 15 using one two-way communication channel. FIG. 5 illustrates the portion of the phase comparison relays 11 and 11' for generating the square wave signals at each terminal. As shown for the phase comparison relay 11, the currents, $I_A$, $I_B$ and $I_C$ generated by the current transformer 13 are converted to voltages $V_{iA}$, $V_{iB}$ and $V_{iC}$ respectively in Current to Voltage Converter 23. Signal conditioning such as low pass filtering is applied to the current derived voltages in the circuit 25 to produce conditioned voltage signals $V'_{iA}$-$V'_{iC}$. These conditioned voltages are applied to Offset Keyer and Squarer Circuits 27 along with the $I_{KEY}$, $L_P$, and $L_N$ to produce the square wave signals $I_{SW}$, $I_{SWP}$ and $I_{SWN}$ for each phase in accordance with the scheme described in connection with FIGS. 2 through 4. Suitable Offset Keyer and squarer circuits for accomplishing this function are disclosed in U.S. Pat. No. 4,053,940.

Figure 6:
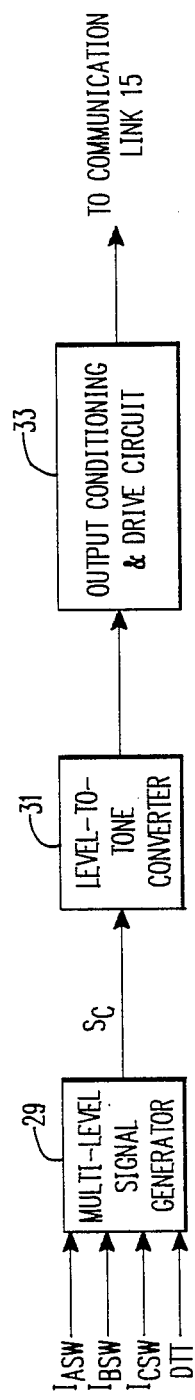
FIG. 6 is a block diagram of a portion of the protective relay in accordance with the invention which prepares the square wave signals for transmission to the other terminal.

As previously discussed, only the square wave signals $I_{SW}$ for each phase are transmitted to the other terminal. As shown in FIG. 6, these signals $I_{SW}$ for each phase are applied to a Multi-level Signal Generator 29, together with a direct transfer trip signal DTT, to generate a combined square wave signal $S_C$ which is applied to a Level-To-Tone Converter 31. The combined signal $S_C$ is used in the Level-To-Tone Converter 31 to modulate a carrier signal to produce a tone signal having a frequency related to the magnitude of the combined signal. This tone signal is passed through Output Conditioning and Drive Circuit 33 for application to the Communication Link 15 for transmission to the other terminal.

Figure 7:
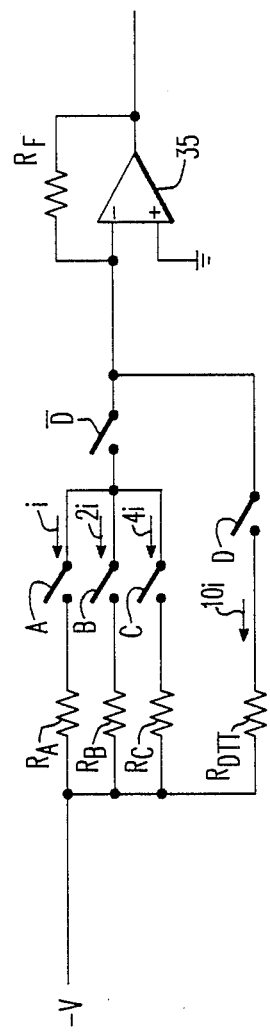
FIG. 7 is a schematic diagram of a circuit in accordance with the invention suitable for generating a combined signal for transmission to the other terminal.

FIG. 7 is a schematic diagram of the Multi-Level Signal Generator 29. An operational amplifier 35 is fed by currents controlled by switches operated by the $I_{SW}$ signals. For instance, switch A is closed when $I_{ASW}$ is high. Switches B and C are similarly controlled by $I_{BSW}$ and $I_{CSW}$ respectively. The resistors $R_A$, $R_B$ and $R_C$ are selected such that with switch A closed, a unit current i is generated by a voltage source $-V$. $R_B$ and $R_C$ are selected such that currents of 2i and 4i are generated when the switches B and C are closed. Another switch D is controlled by the direct transfer trip signal DTT. The resistor $R_{DTT}$ is selected such that a current of 10i is generated when switch D is closed. A complimentary switch $\overline{D}$ opens when switch D is closed to assure that a current of 10i is generated in response to a command for a direct transfer trip. The operational amplifier 35 sums the currents generated by the combinations of closures of the switches A, B, C and D to generate a multi-level combined signal.

FIG. 8 is a truth table for the Multi-level Combined Signal Generator 29 of FIG. 7. With no event, all of the $I_{SW}$ signals and DTT low, a zero level combined signal is generated. All eight possible combinations of the three signals $I_{ASW}$, $I_{BSW}$ and $I_{CSW}$ are represented by the levels 0 through 7. A direct transfer trip (DTT) produces a 10 level combined signal. Levels 8 and 9 can be used for other selected priority functions. For instance, instead of using DTT for all direct transfer trips, separate priority signals could be used to indicate a direct transfer trip for maintenance, another for a failure of a circuit breaker to trip in another protective line segment, and so forth. Information concerning other events or conditions could be transmitted as a priority function on the single communications channel if desired. Like DTT, these other priority functions can be independent of the $I_{AW}$ signals as shown by the Xs in the Truth Table of FIG. 8.

Figure 9:
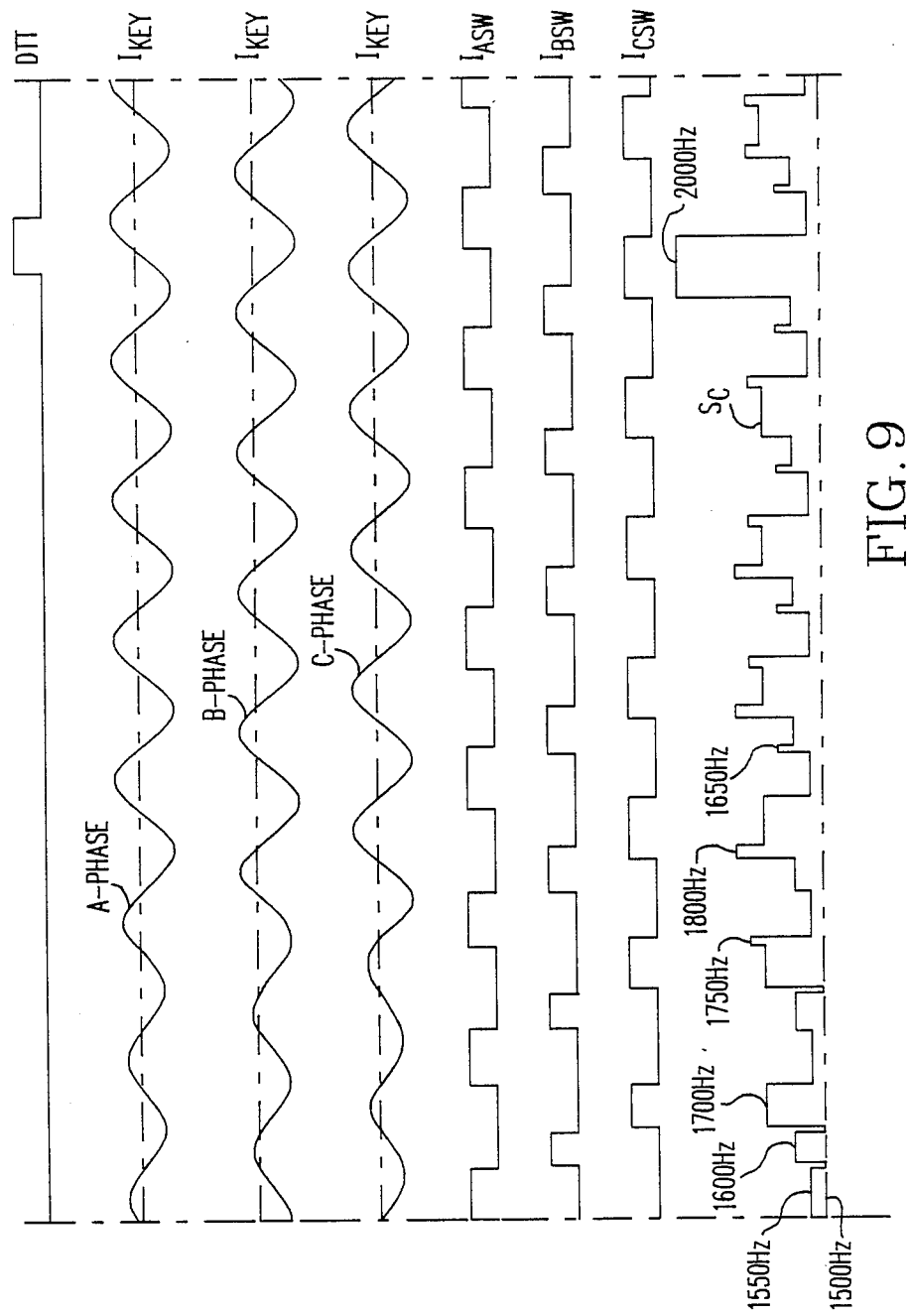
FIG. 9 is a waveform diagram illustrating the timing of signals generated by the circuit of FIG. 7 in response to fault conditions.

FIG. 9 illustrates the timing of the wave forms generated by the phase comparison relays of the invention in response to the currents of phases A, B, and C following a fault. As seen in the figure, each of the phase currents exceeds the keying level, $I_{KEY}$, so that square waves $I_{SW}$ are generated for each phase. While the three phase currents A, B and C are 120 degrees apart, it can be seen that there is some overlap in the $I_{SW}$ signals due to the greater magnitude to the fault current in phase C. The combined signal $S_C$ is the sum of the signals $I_{ASW}$, $I_{BSW}$ and $I_{CSW}$. The direct transfer trip signal DTT is also included in FIG. 9 as well as its contribution to the combined signal $S_C$. As can be seen, the combined signal $S_C$ represents by its discrete voltage levels the instantaneous combination of the monitored events at the terminal.

The combined signal $S_C$ generated at each terminal is transmitted to the other terminal over the Communications Link 15. Where the communications link comprises a telephone channel, the combined signal $S_C$ is converted to various frequency tones. For instance, a base level of 1500 Hz can be used for the zero level with approximately 50 Hz steps between levels so that at level 10, representing DTT, the frequency is 2000 Hz as shown on the waveform $S_C$. This conversion can be implemented, for instance, by the pulse period modulator of U.S. Pat. No. 4,380,746. As one alternative, tones could be generated directly by a logic controlled tone generator integrated circuit. This would allow direct tone generation from the logic state as shown by the truth table of FIG. 8.

Figure 10:
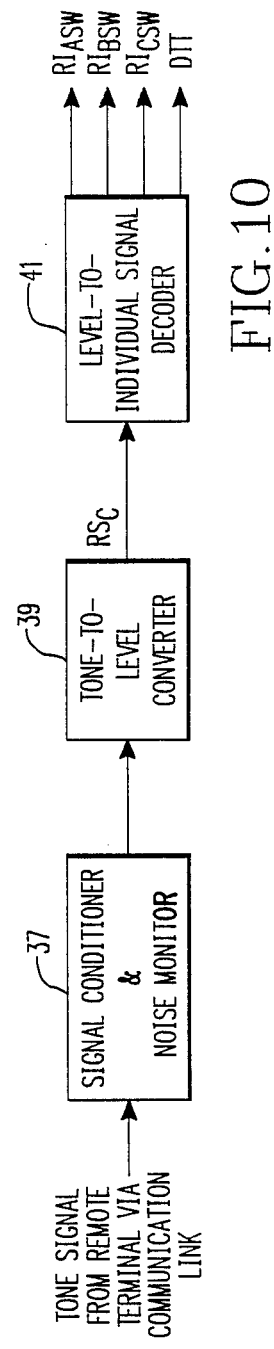
FIG. 10 is a block diagram of the protective relay in accordance with the invention which extracts remote square wave signals from the modulated carrier signal.

As shown in FIG. 10, each phase comparison relay 11, 11', receives the tone signal transmitted from the other terminal over the Communications Link 15 and passes it through a Signal Conditioning and Noise Monitoring Circuit 37. The conditioned tone signal is converted back to a remote multi-level combined voltage signal $RS_C$ in a tone to level converter 39. The demodulator of U.S. Pat. No. 4,510,453 is suitable for this purpose. The multi-level combined signal is then applied to the Level-To-Individual Signal Decoder 41 for extraction of the remote square wave signals $RI_{SW}$ for each phase and the direct transfer trip signal DTT.

Figure 11:
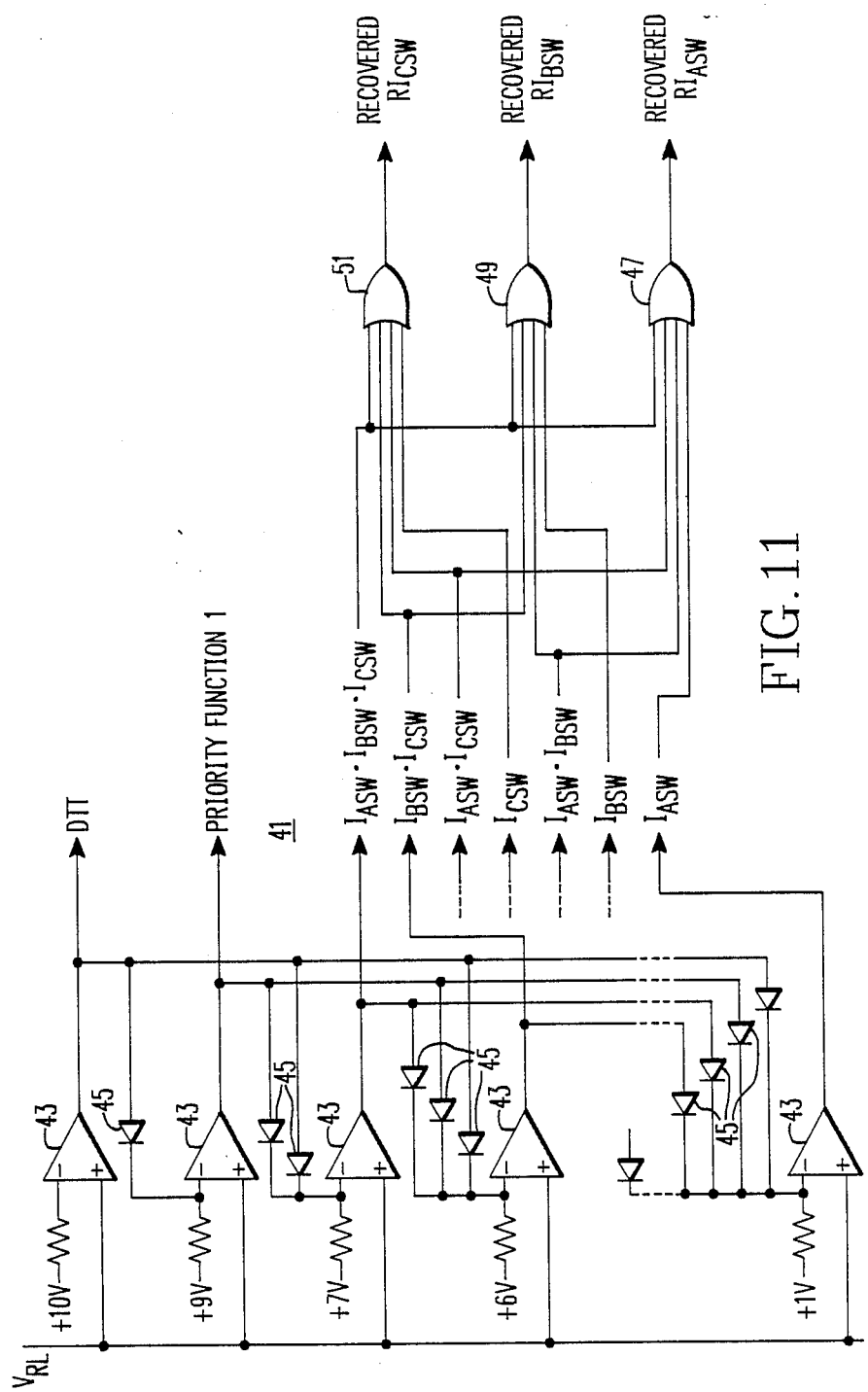
FIG. 11 is a schematic diagram of a suitable circuit for extracting remote square wave signals from the demodulated combined signal.

The details of the Level-To-Individual Signal Decoder 41 are illustrated in FIG. 11. The recovered level signal $RS_C$ which is similar to the combined signal $S_C$ shown in FIG. 9 is applied to a comparator 43 associated with each of the individual signals. The signal $RS_C$ is compared in each of the comparators 43 with a reference voltage corresponding to each of the respective individual signals. Thus, the signal $RS_C$ is compared in the upper comparator 37 with a 10 volt reference signal to generate the DTT signal. If $RS_C$ exceeds the 10 volt reference signal, DTT goes high. Similarly, immediate signals corresponding to each of the combinations of $I_{SW}$ signals listed in the truth table of FIG. 8 go high when $RS_C$ equals the reference voltage applied to the associated comparator 43. The inverting input of each of the lower comparators in FIG. 11 to which the reference voltage is applied are tied to the outputs of each of the comparators above by a diode 45 so that only the signal associated with the highest level reference signal at any instant can go high. The intermediate signals representing the various combinations of the square wave signals which include the phase A signal are applied to an OR circuit 47 to generate the recovered remote phase A square wave signal $RI_{ASW}$. Similarly $RI_{BSW}$ and $RI_{CSW}$ are recovered by applying the intermediate recovered level signals containing the respective phase components to the OR circuits 49 and 51.

Figure 12:
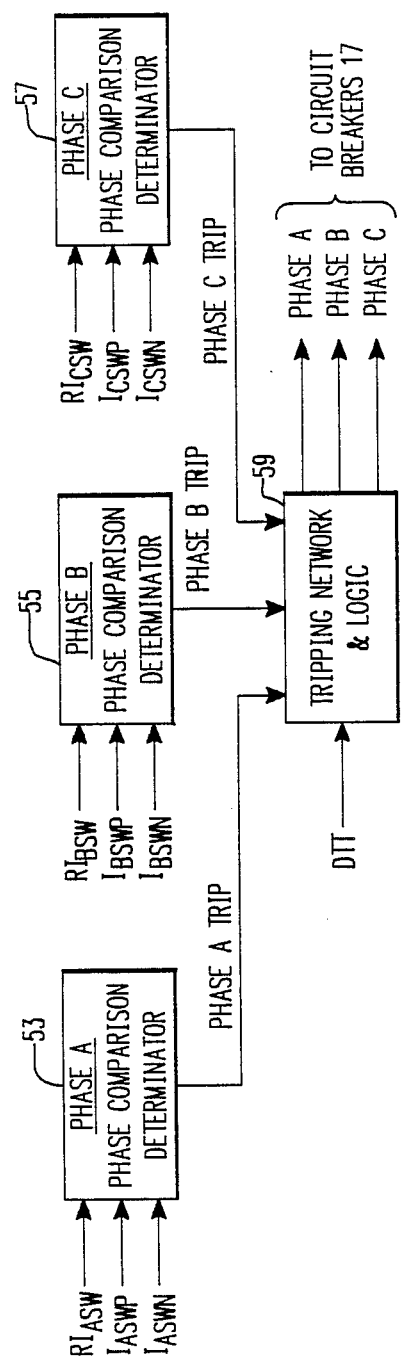
FIG. 12 is a block diagram of a portion of the phase comparison relay of the invention illustrating the phase comparison and tripping signal generating circuits.

The remote square wave signals for each phase received from the other terminal are applied to a Phase Comparison Determinator 53, 55, and 57 for phases A, B and C respectively as shown in FIG. 12. The remote square wave signal for each phase is compared with the local positive and negative square wave signal for that phase in the associated Phase Comparison Determinator. Thus, $RI_{ASW}$ is compared with $I_{ASWP}$ and $I_{ASWN}$ in the Phase Comparison Determinator 53 in the manner explained in connection with FIGS. 2 through 4. Suitable circuits for making these comparisons are disclosed in U.S. Pat. No. 4,053,940. Upon detection of an internal fault, the Phase Comparison Determinators generate a respective phase trip signal. The phase trip signals for each phase are applied to a Tripping Network and Logic Circuit 59, together with the direct transfer trip signal DTT, to determine whether a single phase or three-phase trip should be initiated in accordance with known practice.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. Protective relay apparatus for controlling circuit breakers at spaced apart terminals in a protected line segment in a multiphase ac transmission line, said apparatus comprising:
   a protective relay associated with each terminal; and
   a single channel two-way communications link between said protective relays, each protective relay including:
      means monitoring selected parameters in said ac transmission line at the associated terminal for each phase thereof;
      means generating from said parameter signals square wave signals for each phase representative of predetermined conditions at the associated terminal;
      means generating a single, modulated carrier signal having discrete levels of modulation for each instantaneous combination of selected of said square wave signals for each phase for transmission over said single channel of said two-way communications link to said other terminal;
      means generating remote square wave signals corresponding to the selected square wave signals at the other terminal, from the single, modulated carrier signal received over the single channel of said communications link; and
      means comparing for each phase the remote square wave signals received from the other terminal with designated ones of said square wave signals generated at said terminal, and generating trip signals for said circuit breakers in response to predetermined comparisons.

2. The apparatus of claim 1 wherein said means for generating a single, modulated carrier signal having discrete levels of modulation, comprises:
   means generating a combined signal having discrete amplitude levels representative of the instantaneous combination of said selected square wave signals; and
   means modulating a single carrier signal to generate said single, modulated carrier signal having discrete levels of modulation for each instantaneous discrete amplitude level of said combined signal 3. The apparatus of claim 1 wherein said protective relays are phase comparison relays, wherein said parameter monitoring means monitors currents in each phase of the protected line segment at the associated terminal, wherein said means generating square wave signals comprises means generating square wave signals from a comparison of phase current with a keying level selected to represent fault conditions, and wherein said comparing means compares the phase of the remote square wave signals with the phase of designated square wave signals representing instants when the current for each phase at the associated terminal exceeds designated levels representative of a fault condition.

4. The apparatus of claim 3 wherein each phase comparison relay includes means generating a square wave signal for a selected priority function, wherein said means for generating a single, modulated carrier signal generates said carrier signal with a discrete level of modulation for said priority function square wave, and wherein each phase comparison relay includes means generating a preset response to a remote priority function square wave signal generated by said remote square wave generating means.

5. The apparatus of claim 4 wherein said selected priority function is a direct transfer trip command and wherein said means which responds to the remote priority function square wave signal generates a trip signal in response to the remote direct transfer trip square wave signal.

6. Phase comparison relaying apparatus for controlling circuit breakers at spaced apart terminals in a protected line segment in a multi-phase ac transmission line, said apparatus comprising:
   a phase comparison relay associated with each terminal; and
   a single channel two-way communications link between said phase comparison relays, each phase comparison relay including:
      means measuring the current in each phase of said transmission line at the associated terminal;
      means generating a square wave signal for each phase of said ac transmission line representative of the instants when the measured current of that phase is above and when it is below a selected keying level representative of a fault condition;
      means generating a single, multi-level combined signal having a unique discrete level for each instantaneous combination of square wave signals;

means modulating a single carrier signal with said single multi-level combined signal to generate a single, modulated carrier signal;

means transmitting said single, modulated carrier signal to the other terminal;

means demodulating said single, modulated carrier signal received from the other station, to generate a single, remote, multi-level combined signal;

means decoding said single, remote, multi-level combined signal to generate remote square wave signals for each phase;

means for generating local square wave security margin signals for each phase from said measured currents; and means for comparing said remote square wave signal for each phase with said local square wave security margin signals for that phase and generating a circuit breaker trip signal when said remote square wave signal and said local square wave security margin signal have a predetermined phase relation.

7. The apparatus of claim 6 wherein each phase comparison relay includes means generating a square wave signal for a selected priority function, wherein said means from generating a single, multi-level combined signal generates said signal with a discrete value in response to a priority function square wave, wherein said decoding means includes means for generating a remote priority function square wave signal, and wherein each phase comparison relay includes means which generates a predetermined response to a remote priority square wave signal.

8. The apparatus of claim 7 wherein said priority function is a direct transfer trip command and wherein said means which responds to said direct transfer trip command generates a trip signal for the associated circuit breaker.

9. The apparatus of claim 6 wherein said means generating a single, multi-level combined signal comprises means generating signals for each separate square wave of different unit value and means adding said signals of different unit value to generate said single, multi-level combined signal, said unit values for each square wave signal being selected such that a unique sum is produced for each unique combination of said square waves.

10. The apparatus of claim 6 wherein said decoder means comprises means for generating reference signals corresponding to each said unique sum, means for comparing said remote combined signal with each said reference signal and generating one of a plurality of intermediate signals for the combination of square wave signals represented by the level of the single, remote, multi-level combined signal, and gate means for each selected square wave signal responsive to each intermediate signal which represents a combination including that square wave signal to generate said remote square wave signal.

* * * * *